(12) United States Patent
Pu et al.

(10) Patent No.: US 11,692,607 B2
(45) Date of Patent: Jul. 4, 2023

(54) MAGNETIC SUSPENSION TYPE SENSING SYSTEM FOR SPACE FULL-DEGREE-OF-FREEDOM ABSOLUTE POSES

(71) Applicants: Chongqing University, Chongqing (CN); Shanghai University, Shanghai (CN)

(72) Inventors: Huayan Pu, Chongqing (CN); Yan Jing, Chongqing (CN); Jinglei Zhao, Chongqing (CN); Jun Luo, Chongqing (CN); Yi Qin, Chongqing (CN); Zhijiang Xie, Chongqing (CN); Jie Ma, Chongqing (CN)

(73) Assignees: Chongqing University, Chongqing (CN); SHANGHAI UNIVERSITY, Shanghai (CN)

( * ) Notice: Subject to any disclaimer, the term of this patent is extended or adjusted under 35 U.S.C. 154(b) by 14 days.

(21) Appl. No.: 17/535,747

(22) Filed: Nov. 26, 2021

(65) Prior Publication Data
US 2023/0045158 A1     Feb. 9, 2023

(30) Foreign Application Priority Data

Aug. 4, 2021   (CN) .......................... 202110891549.4

(51) Int. Cl.
*F16F 15/00*     (2006.01)
*F16F 15/03*     (2006.01)
(Continued)

(52) U.S. Cl.
CPC ............ *F16F 15/002* (2013.01); *F16F 15/03* (2013.01); *G01H 11/02* (2013.01); *H02N 15/00* (2013.01); *F16F 2230/14* (2013.01)

(58) Field of Classification Search
CPC ........ F16F 15/002; F16F 15/03; G01H 11/02; H02N 15/00
See application file for complete search history.

(56) References Cited

U.S. PATENT DOCUMENTS 9,777,793 B1 * 10/2017  Chen .................... G05B 19/402

FOREIGN PATENT DOCUMENTS

CN          102155516 A  *  8/2011
CN          104500646 A  *  4/2015
(Continued)

OTHER PUBLICATIONS

Shahadat et al, Parallel-Mechanism Based Vibration Isolation System Using Displacement Cancellation Control, IEEE Xplore. (Year: 2015).*

*Primary Examiner* — David L Singer
(74) *Attorney, Agent, or Firm* — Harness, Dickey & Pierce, P.L.C.

(57) ABSTRACT

A magnetic suspension type sensing system for space full-degree-of-freedom absolute poses is provided. The system includes a reference platform, multiple quasi-zero stiffness supporting legs and a platform to be tested. The reference platform and the platform to be tested are connected in a spherical hinge mode through the multiple quasi-zero stiffness supporting legs. Each of the multiple quasi-zero stiffness supporting legs includes a lower end spherical hinge, a lower end cover, a positive stiffness unit, a negative stiffness unit, a shaft, a lower end shell, an upper end shell and an upper end spherical hinge.

8 Claims, 3 Drawing Sheets

(51) Int. Cl.
    *H02N 15/00*    (2006.01)
    *G01H 11/02*    (2006.01)

(56) References Cited

FOREIGN PATENT DOCUMENTS

| CN | 105041961 A | * | 11/2015 | .............. F16F 15/04 |
| CN | 105570630 A | * | 5/2016 | |
| CN | 106402233 A | * | 2/2017 | ............ F16F 15/002 |
| CN | 107943128 A | * | 4/2018 | ............. G05D 19/02 |
| CN | 108275039 A | * | 7/2018 | |
| CN | 108533669 A | * | 9/2018 | .............. F16F 15/03 |
| CN | 108869626 A | * | 11/2018 | |
| CN | 109027088 A | * | 12/2018 | .............. F16F 6/005 |
| CN | 109027114 A | * | 12/2018 | .............. F16F 15/03 |
| CN | 109630602 A | * | 4/2019 | .............. F16F 15/03 |
| CN | 110365249 A | * | 10/2019 | |
| CN | 110645314 A | * | 1/2020 | |

\* cited by examiner

MAGNETIC SUSPENSION TYPE SENSING SYSTEM FOR SPACE FULL-DEGREE-OF-FREEDOM ABSOLUTE POSES

CROSS REFERENCE TO RELATED APPLICATION

This patent application claims the benefit and priority of Chinese Patent Application No. 202110891549.4, entitled "Magnetic Suspension Type Sensing System for Space Full-Degree-of-Freedom Absolute Poses" filed on Aug. 4, 2021, the disclosure of which is incorporated by reference herein in its entirety as part of the present application.

TECHNICAL FIELD

The present disclosure relates to the field of vibration measurement technologies, and particularly relates to a magnetic suspension type sensing system for space full-degree-of-freedom absolute poses.

BACKGROUND ART

The measurement technology for absolute vibration attitudes has important application value in wide industrial fields, such as ship equipment protection, precise vibration isolation of an optical platform in a vibration environment, locomotive vibration records, unmanned aerial vehicle platform shake prevention, safety detection of an ocean platform and a large-span bridge, and monitoring of large rotating machinery (such as a hydrogenerator set) and seismic wave signals. These vibrations have the following common characteristics: the vibration frequency is low; and a machine base and a foundation vibrate together with a vibrating body, and thus a static reference point is not found or is difficult to find. Therefore, a large number of mature relative vibration measuring methods are difficult to implement. In order to achieve an ideal effect, a low-frequency active vibration control system usually depends on accurate and real-time absolute vibration pose feedback, acceleration and rotating speed signals at low frequency are easily covered by noise. A vibration isolation system based on absolute displacement feedback has low vibration transmission rate and dynamic flexibility, so robustness to external interference can be improved, and low-frequency vibration is eliminated. Accordingly, the problems of measurement time delay and error accumulation can be avoided, and the vibration characteristics of the measured object can be better described.

Researchers already put forward some methods for measuring absolute movement of an object, such as accumulated points of acceleration or speed signals. However, the certain measurement noise inevitably exists in measurement signals of any actual sensing device, and for low-frequency vibration, non-negligible accumulated errors are inevitably introduced in the long-time process of accumulated points. An additional speed sensor is needed for measuring the speed, so that the use cost is increased. In addition, only single-degree-of-freedom motion can be measured through the measurement methods, and higher degree-of-freedom motion cannot be well measured. In other words, the traditional sensing technology for the absolute vibration displacement often has defects in the aspects of installation, precision, cost and the like, and is difficult to consider accuracy, real-time performance and cost simultaneously when vibration poses are directly calculated or indirectly estimated through inertial measurement technologies such as accelerometers and gyroscopes.

SUMMARY

The embodiments aim to provide a magnetic suspension type sensing system for space full-degree-of-freedom absolute poses. The system realizes quasi-zero stiffness through an electromagnetic mechanism, so that an absolutely static reference platform is provided, and accurate measurement of space full-degree-of-freedom vibration poses is realized. The system is wide in measurement frequency band, high in sensitivity, high in adaptability and long in service life.

In order to achieve the above purpose, the present disclosure provides the following solution.

A magnetic suspension type sensing system for space full-degree-of-freedom absolute poses includes a reference platform, multiple quasi-zero stiffness supporting legs and a platform to be tested. The reference platform is connected with the platform to be tested in a spherical hinge mode through the multiple quasi-zero stiffness supporting legs.

Each of the multiple quasi-zero stiffness supporting legs includes a lower end spherical hinge, a lower end cover, a positive stiffness unit, a negative stiffness unit, a shaft, a lower end shell, an upper end shell and an upper end spherical hinge. A spherical hinge end of the lower end spherical hinge is connected with the platform to be tested. An other end of the lower end spherical hinge is threadedly connected with an end of the lower end cover. An other end of the lower end cover is threadedly connected with an end of the lower end shell. An other end of the lower end shell is connected with an end of the upper end shell. A spherical hinge end of the upper end spherical hinge is connected with the reference platform. An other end of the upper end spherical hinge is threadedly connected with an other end of the upper end shell. The shaft is arranged in the lower end shell. An end of the shaft is connected with the upper end shell. The positive stiffness unit and the negative stiffness unit are each arranged on both the shaft and an inner wall of the lower end shell.

Further, the positive stiffness unit may include a first positive stiffness coil, a second positive stiffness coil, a first positive stiffness magnet and a second positive stiffness magnet. The first positive stiffness coil and the second positive stiffness coil may be fixed on the inner wall of the lower end shell. The first positive stiffness magnet and the second positive stiffness magnet may be both axially magnetized. Magnetization directions of the first positive stiffness magnet and the second positive stiffness magnet may be opposite. Different magnetic poles of the first positive stiffness magnet and the second positive stiffness magnet may be arranged opposite to each other. The first positive stiffness magnet and the second positive stiffness magnet may be fixed on the shaft.

Further, a first gasket may be arranged between the first positive stiffness magnet and the second positive stiffness magnet.

Further, the negative stiffness unit may include a first negative stiffness coil, a second negative stiffness coil, a first negative stiffness magnet and a second negative stiffness magnet. The first negative stiffness coil and the second negative stiffness coil may be fixed on the inner wall of the lower end shell. The first negative stiffness magnet and the second negative stiffness magnet may be both axially magnetized. The magnetization directions of the first negative stiffness magnet and the second negative stiffness magnet may be opposite. Different magnetic poles of the first negative stiffness magnet and the second negative stiffness magnet may be arranged opposite to each other. The first negative stiffness magnet and the second negative stiffness magnet may be fixed on the shaft.

Further, a second gasket may be arranged between the first negative stiffness magnet and the second negative stiffness magnet.

Further, a notch may be formed in the lower end shell.

Further, each of the multiple quasi-zero stiffness supporting legs further may include an eddy current sensor and a measuring block; The eddy current sensor may be arranged on the lower end cover. A probe end of the eddy current sensor may be aligned with an end face of an end of the measuring block. An other end of the measuring block may be arranged at an other end of the shaft. The eddy current sensor may be configured for measuring a deformation amount of a corresponding one of the quasi-zero stiffness supporting legs.

Further, the system further may include a pose solver, and the pose solver, which is connected with the eddy current sensor of each of the quasi-zero stiffness supporting legs. The pose solver may be configured for obtaining space full-degree-of-freedom absolute displacements and the space full-degree-of-freedom absolute poses of the platform to be tested based on the deformation amount of each of the multiple quasi-zero stiffness supporting legs.

According to the specific embodiment provided by the present disclosure, the embodiments have the following technical effects.

Firstly, an absolute static state of the reference platform is realized by adopting a magnetic suspension type quasi-zero stiffness mechanism, and the absolute motion measurement of an object moving in space is converted into relative motion measurement of the object moving in space. The system is wide in measurement frequency band, high in sensitivity and free of frictional contact, and long in service life.

Secondly, positive stiffness and negative stiffness are provided through the electromagnetic mechanism, the control of the stiffness can be realized by adjustable current, and positive stiffness and negative stiffness are synchronously adjusted and are easy to control.

Thirdly, the magnitude of the current in the coil can be adjusted to match with loads of different sizes, and the system is high in adaptability.

Fourthly, by combining a sensing system that is a single degree of freedom, a magnetic suspension type, and quasi-zero stiffness, with a stewar platform, the sensing system can show high-static and low-dynamic characteristics in the space full-degree-of-freedom by reasonably configuring system parameters, so that the vibration pose sensing in the space full-degree-of-freedom is achieved.

BRIEF DESCRIPTION OF THE DRAWINGS

To describe the technical scheme in the embodiments of the present disclosure or in the prior art more clearly, the following briefly introduces the drawings required for describing the embodiments. Apparently, the drawings in the following description show merely some embodiments of the present disclosure, and those skilled in the art may still derive other drawings from these drawings without creative efforts.

DETAILED DESCRIPTION OF THE EMBODIMENTS

The following clearly and completely describes the technical scheme in the embodiments of the present disclosure with reference to the drawings in the embodiments of the present disclosure. Apparently, the described embodiments are merely a part rather than all of the embodiments of the present disclosure. Based on the embodiment in the present disclosure, all other embodiments obtained by the ordinary technical staff in the art under the premise of without contributing creative labor belong to the scope protected by the present disclosure.

The embodiments aim to provide a magnetic suspension type sensing system for space full-degree-of-freedom absolute poses. The system realizes quasi-zero stiffness through an electromagnetic mechanism, so that an absolutely static reference platform is provided, and accurate measurement of the space full-degree-of-freedom vibration poses is realized. The system is wide in measurement frequency band, high in sensitivity, high in adaptability and long in service life.

To make the foregoing objective, features and advantages of the present disclosure clearer and more comprehensible, the present disclosure is further described in detail below with reference to the drawings and specific embodiments.

Figure 1:
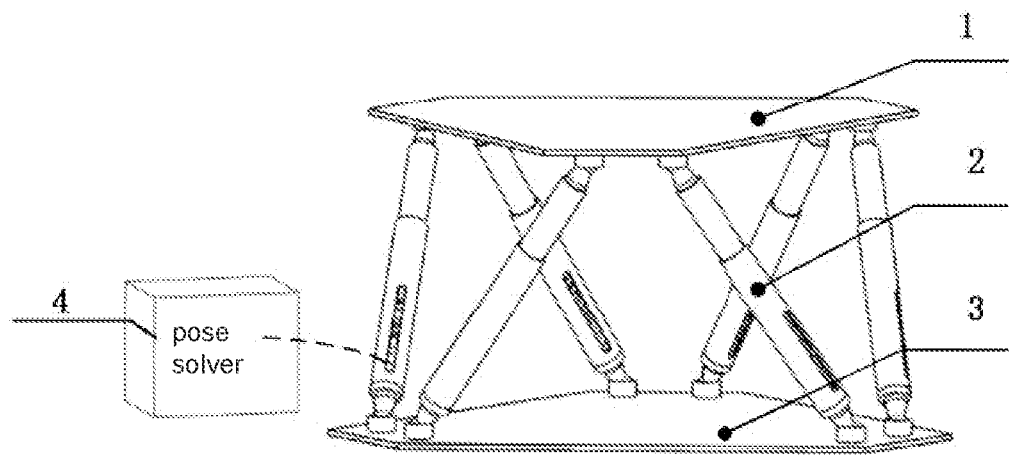
FIG. 1 is an isometric view of a magnetic suspension type sensing system for space full-degree-of-freedom absolute poses according to the embodiment of the present disclosure.
Figure 2:
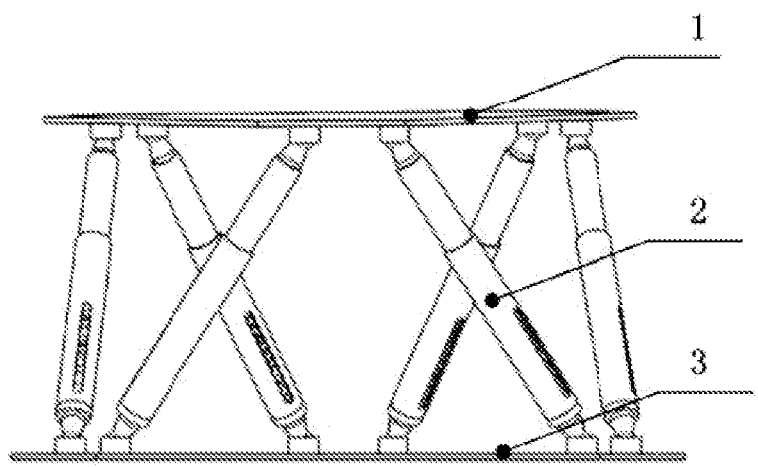
FIG. 2 is a front view of a magnetic suspension type sensing system for space full-degree-of-freedom absolute poses according to the embodiment of the present disclosure.
Figure 3:
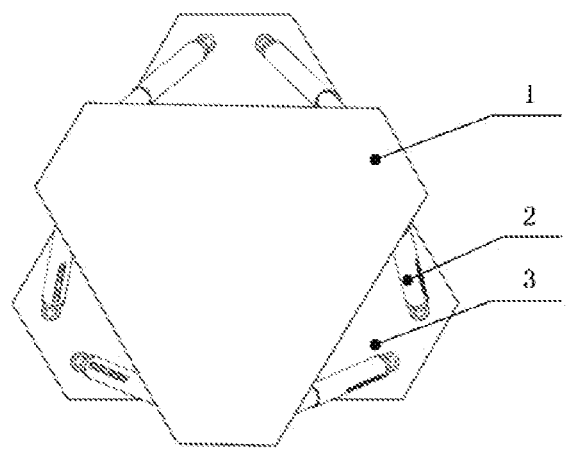
FIG. 3 is a top view of a magnetic suspension type sensing system for space full-degree-of-freedom absolute poses according to the embodiment of the present disclosure.

As shown in FIG. 1 to FIG. 3, a magnetic suspension type sensing system for space full-degree-of-freedom absolute poses is provided and includes a reference platform 1, multiple quasi-zero stiffness supporting legs 2 and a platform to be tested 3. The reference platform 1 is connected with the platform to be tested 3 in a spherical hinge mode through the quasi-zero stiffness supporting legs 2.

Figure 4:
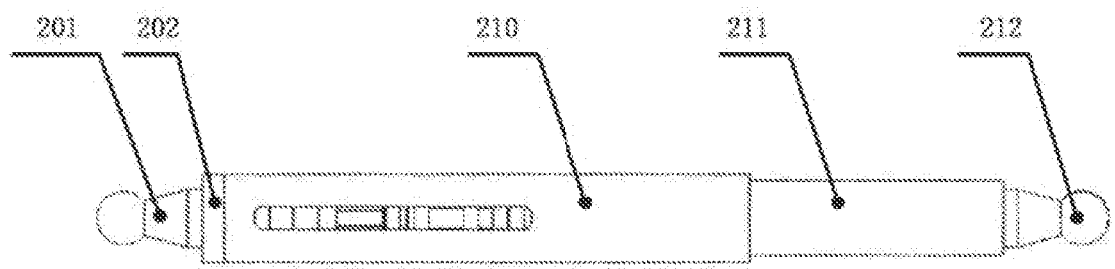
FIG. 4 is a front view of a quasi-zero stiffness supporting leg according to the embodiment of the present disclosure.
Figure 5:
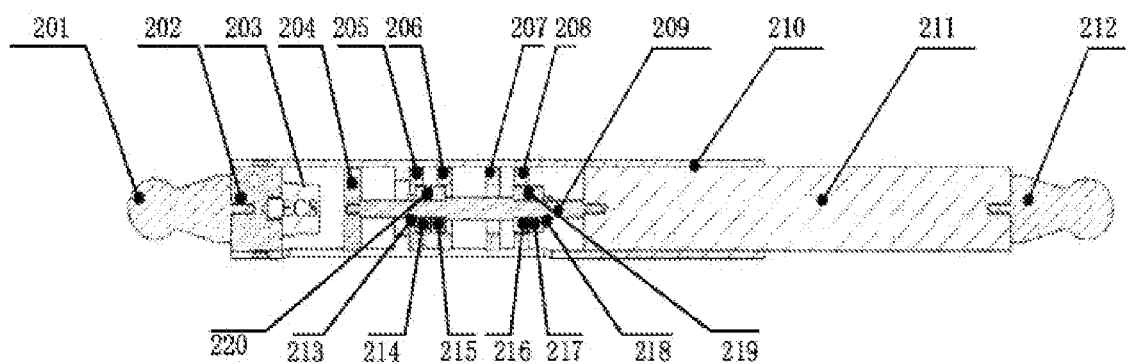
FIG. 5 is a cross-sectional view of the quasi-zero stiffness supporting leg according to the embodiment of the present disclosure.

As shown in FIG. 4 and FIG. 5, the quasi-zero stiffness supporting leg includes a lower end spherical hinge 201, a lower end cover 202, a positive stiffness unit, a negative stiffness unit, a shaft 209, a lower end shell 210, an upper end shell 211 and an upper end spherical hinge 212. A spherical hinge end of the lower end spherical hinge 201 is connected with the platform to be tested 3, and an other end of the lower end spherical hinge 201 is threadedly connected with an end of the lower end cover 202. An other end of the lower end cover 202 is threadedly connected with one end of the lower end shell 210. An other end of the lower end shell 210 is connected with an end of the upper end shell 211. A spherical hinge end of the upper end spherical hinge 212 is connected with the reference platform 1, and an other end of the upper end spherical hinge 212 is threadedly connected with the other end of the upper end shell 211. The shaft 209 is arranged in the lower end shell 210, and an end of the shaft 209 is connected with the upper end shell 211.

The positive stiffness unit and the negative stiffness unit are each arranged on both the shaft 209 and an inner wall of the lower end shell 210.

Figure 6:
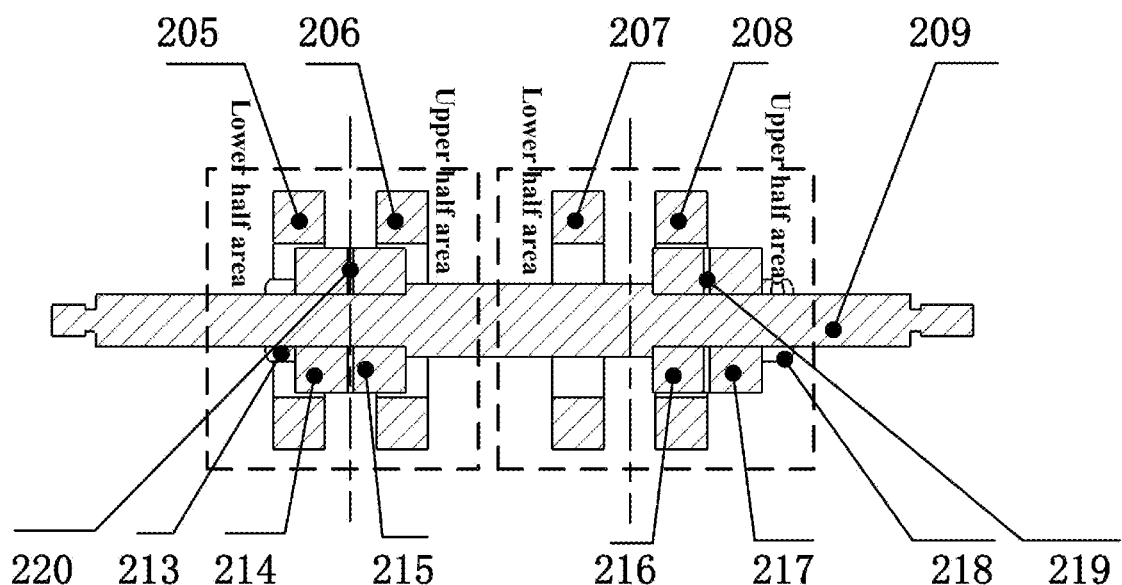
FIG. 6 is a cross-sectional view of a magnetic suspension type quasi-zero stiffness mechanism.

The magnetic suspension type quasi-zero stiffness mechanism is as shown in FIG. 6. The positive stiffness unit includes a first positive stiffness coil 205, a second positive stiffness coil 206, a first positive stiffness magnet 214 and a second positive stiffness magnet 215. An electromagnetic field generated by energized coils interacts with a magnetic field generated by permanent magnets to generate positive stiffness. The first positive stiffness coil 205 and the second positive stiffness coil 206 are fixed on the inner wall of the lower end shell 210. There is no relative sliding between the first positive stiffness coil 205 and the second positive stiffness coil 206. A constant gap is formed between the two coils, the gap may influence the nonlinearity of rigidness and can be selected according to actual requirements. Generally, the size of the gap is the thickness of a coil.

The first positive stiffness magnet 214 and the second positive stiffness magnet 215 are both axially magnetized, the magnetization directions of the first positive stiffness magnet 214 and the second positive stiffness magnet 215 are opposite, and different magnetic poles of the first positive stiffness magnet 214 and the second positive stiffness magnet 215 are arranged opposite to each other. The first positive stiffness magnet 214 and the second positive stiffness magnet 215 are fixed on the shaft 209 through a first fixed ring 213. The permanent magnet does not slide relative to the motion shaft. A gasket 220 is installed between the first positive stiffness magnet 214 and the second positive stiffness magnet 215. The thickness of the gasket also can affect the nonlinearity of stiffness, which should be calculated according to a specific dimension. The inner diameter of the electromagnetic coil is slightly larger than the outer diameter of the permanent magnet, so that when the permanent magnet drives the shaft to move up and down, motion interference between the electromagnetic coil and the permanent magnet is avoided.

The negative stiffness unit includes a first negative stiffness coil 207, a second negative stiffness coil 208, a first negative stiffness magnet 216 and a second negative stiffness magnet 217.

The first negative stiffness coil 207 and the second negative stiffness coil 208 are fixed on the inner wall of the lower end shell 210. The first negative stiffness magnet 216 and the second negative stiffness magnet 217 are both axially magnetized, the magnetization directions of the first negative stiffness magnet 216 and the second negative stiffness magnet 217 are opposite, and different magnetic poles of the first negative stiffness magnet 216 and the second negative stiffness magnet 217 are arranged opposite to each other. The first negative stiffness magnet 216 and the second negative stiffness magnet 217 are fixed on the shaft 209 through a second fixed ring 218. A gasket 219 is arranged between the first negative stiffness magnet 216 and the second negative stiffness magnet 217.

The size and the installation condition of the negative stiffness unit are the same as those of the positive stiffness unit, and the difference points of the negative stiffness unit and the positive stiffness unit are the coil energizing direction and the motion range of the permanent magnet. In the embodiment, through the energizing direction of the second positive stiffness coil 206 of the positive stiffness unit, the direction of the magnetic field generated by the second positive stiffness coil 206 is the same as the direction of the magnetic field generated by the second positive stiffness magnet 215, and the energizing direction of the first positive stiffness coil 205 is opposite to the energizing direction of the second positive stiffness coil 206. Through the energizing direction of the second negative stiffness coil 208 of the negative stiffness unit, the direction of the magnetic field generated by the coils is opposite to the direction of the magnetic field generated by the second negative stiffness magnet 217, and the energizing direction of the first negative stiffness coil 207 is opposite to the energizing direction of the second negative stiffness coil 207. The magnitude of the current in all the coils is the same. In order that the positive unit and the negative stiffness unit have no influence therebetween, a certain gap should be remained between the second positive stiffness coil 206 and the first negative stiffness coil 207. Generally, the size of the gap is the thicknesses of at least two coils and can be selected according to requirements.

The embodiment, a notch is formed in the lower end shell 210 for wiring and observing of internal conditions.

The embodiment, the quasi-zero stiffness supporting leg 2 further includes an eddy current sensor 203 and a measuring block 204. The eddy current sensor 203 is arranged on the lower end cover 202. A probe end of the eddy current sensor 203 is aligned with an end face of an end of the measuring block 204. An other end of the measuring block 204 is arranged at an other end of the shaft 209. The measuring block 204 and the upper end shell 211 move along with the motion shaft 209. The eddy current sensor 203 is configured for measuring a deformation amount of the quasi-zero stiffness supporting leg 2.

The system further includes a pose solver 4 which is connected with all the eddy current sensors 203 and configured for obtaining space full-degree-of-freedom absolute displacements and the space full-degree-of-freedom poses of the platform to be tested according to the deformation amount of each quasi-zero stiffness supporting leg 2.

In order to enable the system to generate a constant force to bear the weight of the shaft, the measuring block, the permanent magnet and the upper end shell in the moving process, the force generated by the positive stiffness unit and the force generated by the negative stiffness unit need to be upward in an axial direction. The electromagnetic unit, i.e., each of the positive stiffness unit and the negative stiffness unit, is divided into an upper half area and a lower half area by taking an axial middle position of the two coils as a boundary line. The lower half area is one end of the electromagnetic unit which is close to the platform to be tested, and the upper half area of the electromagnetic unit is close to one end of the reference platform. A motion range of the permanent magnets in the positive stiffness unit should be in the lower half area, and a motion range of the permanent magnets in the negative stiffness unit should be in the upper half area.

In the embodiment, the positive stiffness unit and the negative stiffness unit in each supporting leg are all of an electromagnetic type. A magnetic suspension is achieved when the coils are electrified, the shaft and parts fixed to the shaft do not make frictional contact with surrounding parts when the shaft and the parts move, and mechanism damping can be effectively reduced. Since the positive stiffness unit and the negative stiffness unit have the same structure size, and the magnitudes of current in the coils are the same, stiffness with equal size and opposite directions can be generated. Quasi-zero stiffness is realized after the stiffness with equal size and opposite directions is superposed, which expands the low-frequency measurement bandwidth. By adjusting the magnitude of current in the positive stiffness unit and negative stiffness unit, the stiffness can be adjusted, which improves the convenience of mechanism control. The magnitude of current is changed to match with different loads, so that the adaptability of the mechanism is improved. The six magnetic suspension type quasi-zero stiffness supporting legs jointly achieve quasi-zero stiffness of the whole system. When the vibration of the platform to be tested in space happens, because the comprehensive stiffness of the system is close to zero, the movement of the platform to be tested cannot be transmitted to the reference platform. Therefore, the reference platform is in an absolute static state. The deformation amounts of the six supporting legs can be measured through the respective eddy current sensors, the six deformation amounts are input into the pose solver, and the space full-degree-of-freedom absolute displacements and the space full-degree-of-freedom poses of the platform to be tested can be obtained through the kinematics positive solution of the six-degree-of-freedom device.

All embodiments in this specification are described in a progressive manner. Each embodiment focuses on differences from other embodiments. For the part that is the same or similar between different embodiments, reference may be made between the embodiments.

Several examples are used for illustration of the principles and implementation methods of the present disclosure. The description of the embodiments is used to help illustrate the method and the core principles of the present disclosure. Those skilled in the art can make various modifications in terms of specific embodiments and scope of application in accordance with the teachings of the present disclosure. In conclusion, the content of this specification shall not be construed as a limitation to the present disclosure.

What is claimed is:

1. A magnetic suspension type sensing system for space full-degree-of-freedom absolute poses, the system comprising:
    a reference platform;
    a plurality of quasi-zero stiffness supporting legs; and
    a platform to be tested;
    wherein the reference platform is connected with the platform to be tested in a spherical hinge mode through the plurality of quasi-zero stiffness supporting legs;
    wherein each of the plurality of quasi-zero stiffness supporting legs comprises:
        a lower end spherical hinge;
        a lower end cover;
        a positive stiffness unit;
        a negative stiffness unit, a shaft, a lower end shell;
        an upper end shell; and
        an upper end spherical hinge;
        wherein a spherical hinge end of the lower end spherical hinge is connected with the platform to be tested, and an other end of the lower end spherical hinge is threadedly connected with an end of the lower end cover;
        wherein an other end of the lower end cover is threadedly connected with an end of the lower end shell, an other end of the lower end shell is connected with an end of the upper end shell, a spherical hinge end of the upper end spherical hinge is connected with the reference platform, and an other end of the upper end spherical hinge is threadedly connected with an other end of the upper end shell;
        wherein the shaft is arranged in the lower end shell, and an end of the shaft is connected with the upper end shell; and
        wherein the positive stiffness unit and the negative stiffness unit are each arranged on both the shaft and an inner wall of the lower end shell.

2. The magnetic suspension type sensing system for space full-degree-of-freedom absolute poses according to claim 1, wherein the positive stiffness unit comprises:
    a first positive stiffness coil;
    a second positive stiffness coil;
    a first positive stiffness magnet; and
    a second positive stiffness magnet;
    wherein the first positive stiffness coil and the second positive stiffness coil are fixed on the inner wall of the lower end shell; and
    wherein the first positive stiffness magnet and the second positive stiffness magnet are both axially magnetized, magnetization directions of the first positive stiffness magnet and the second positive stiffness magnet are opposite, different magnetic poles of the first positive stiffness magnet and the second positive stiffness magnet are arranged opposite to each other, and the first positive stiffness magnet and the second positive stiffness magnet are fixed on the shaft.

3. The magnetic suspension type sensing system for space full-degree-of-freedom absolute poses according to claim 2, wherein a first gasket is arranged between the first positive stiffness magnet and the second positive stiffness magnet.

4. The magnetic suspension type sensing system for space full-degree-of-freedom absolute poses according to claim 1, wherein the negative stiffness unit comprises:
    a first negative stiffness;
    a second negative stiffness coil;
    a first negative stiffness magnet; and
    a second negative stiffness magnet;
    wherein the first negative stiffness coil and the second negative stiffness coil are fixed on the inner wall of the lower end shell; and
    wherein the first negative stiffness magnet and the second negative stiffness magnet are axially magnetized, the magnetization directions of the first negative stiffness magnet and the second negative stiffness magnet are opposite, different magnetic poles of the first negative stiffness magnet and the second negative stiffness magnet are arranged opposite to each other, and the first negative stiffness magnet and the second negative stiffness magnet are fixed on the shaft.

5. The magnetic suspension type sensing system for space full-degree-of-freedom absolute poses according to claim 4, wherein a second gasket is arranged between the first negative stiffness magnet and the second negative stiffness magnet.

6. The magnetic suspension type sensing system for space full-degree-of-freedom absolute poses according to claim 1, wherein a notch is formed in the lower end shell.

7. The magnetic suspension type sensing system for space full-degree-of-freedom absolute poses according to claim 1, wherein each of the plurality of quasi-zero stiffness supporting legs further comprises an eddy current sensor and a measuring block;
    wherein the eddy current sensor is arranged on the lower end cover, a probe end of the eddy current sensor is aligned with an end face of an end of the measuring block, and an other end of the measuring block is arranged at an other end of the shaft; and
    wherein the eddy current sensor is configured for measuring a deformation amount of a corresponding one of the quasi-zero stiffness supporting legs.

8. The magnetic suspension type sensing system for space full-degree-of-freedom absolute poses according to claim 7, wherein the system further comprises a pose solver, which is connected with the eddy current sensor of each of the quasi-zero stiffness supporting legs, and the pose solver is configured for obtaining space full-degree-of-freedom absolute displacements and the space full-degree-of-freedom absolute poses of the platform to be tested based on the deformation amount of each of the plurality of quasi-zero stiffness supporting legs.

* * * * *